March 18, 1924.                                              1,487,668
G. W. REHFELD
SILT ACCUMULATOR
Filed April 9, 1921                    2 Sheets-Sheet 1
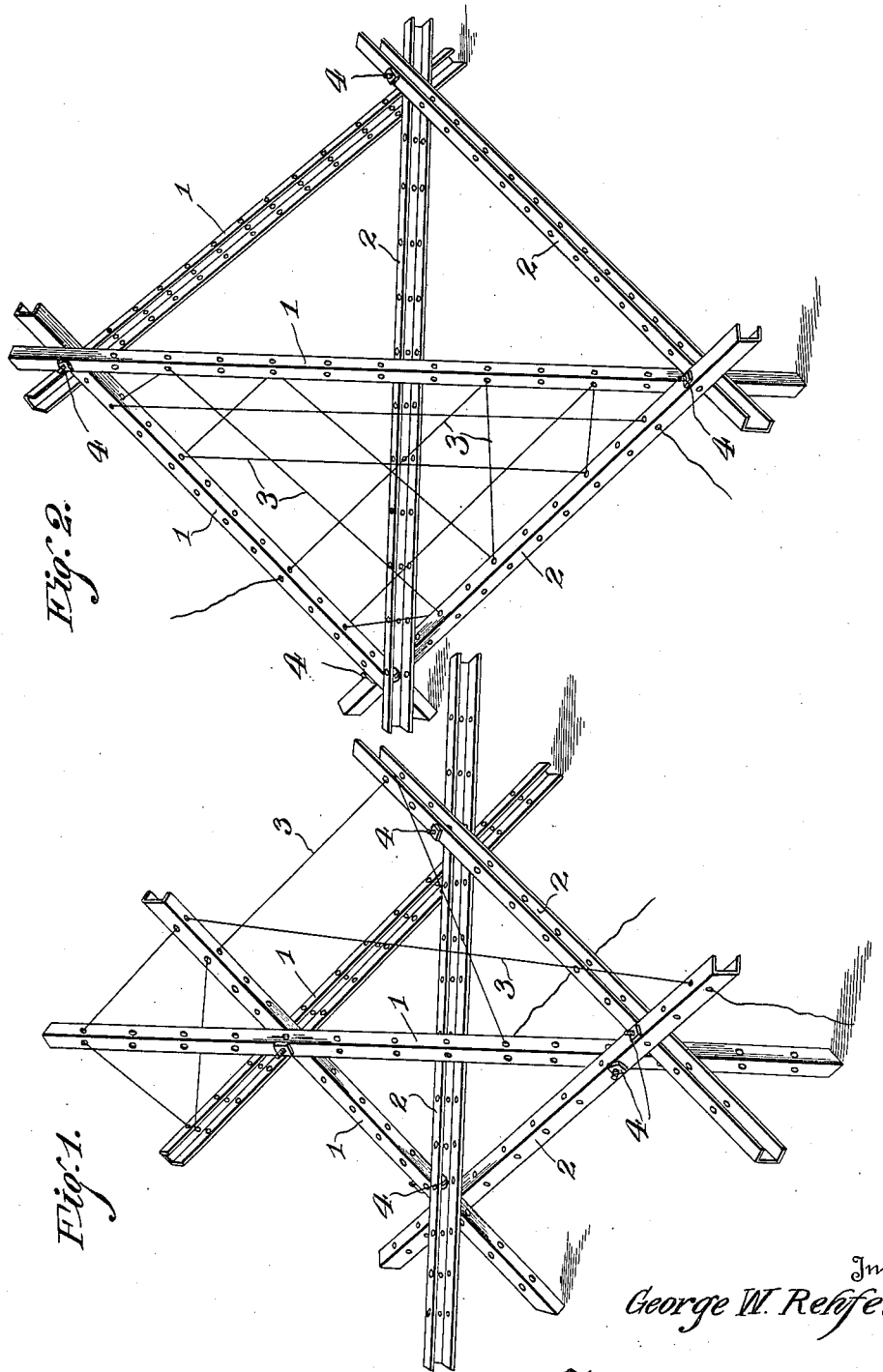
Inventor
George W. Rehfeld
By William B. Jaynes,
Attorney March 18, 1924.
G. W. REHFELD
SILT ACCUMULATOR
Filed April 9, 1921
1,487,668
2 Sheets-Sheet 2
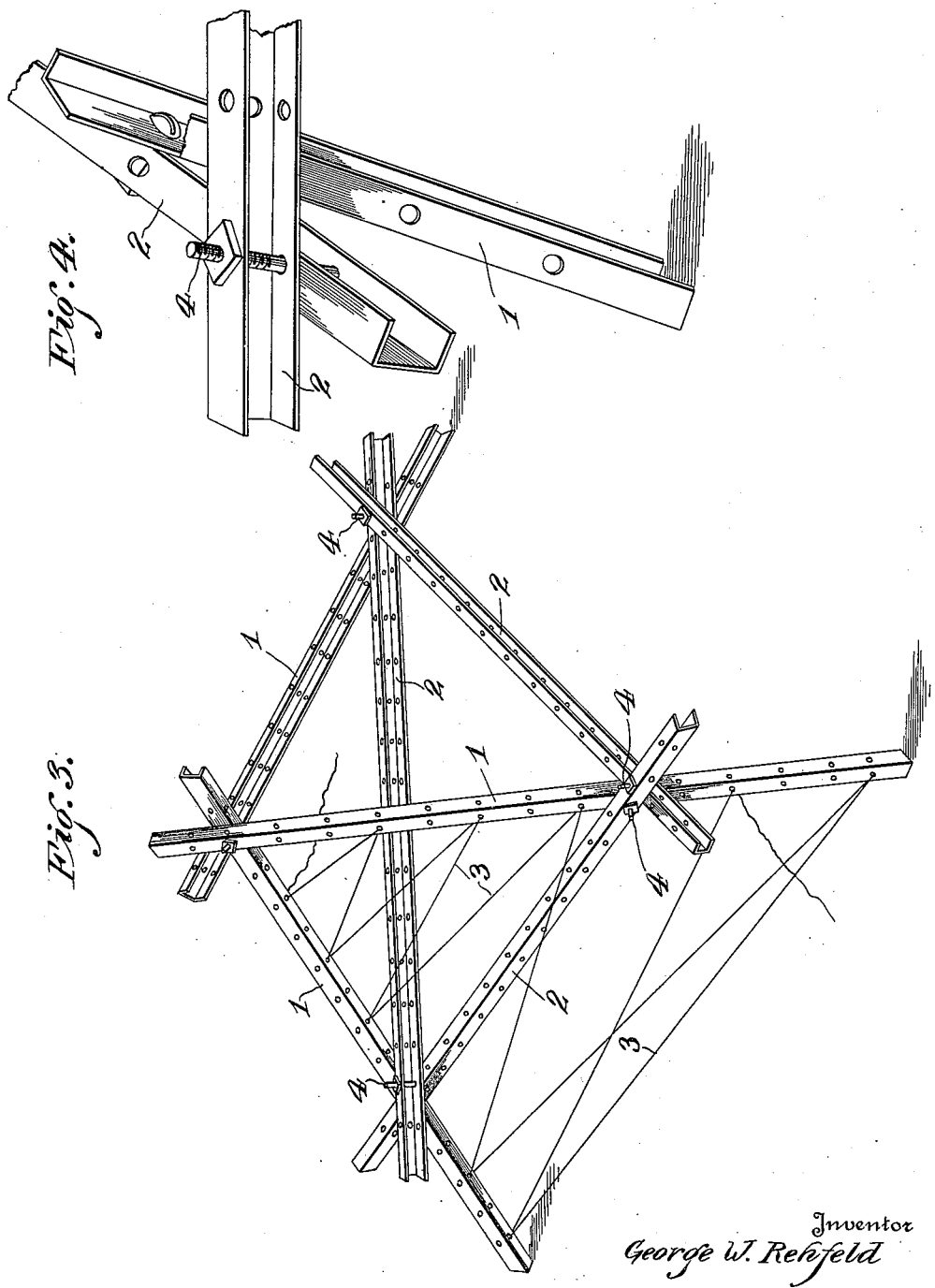
Inventor
George W. Rehfeld
By William B. Jaynes,
Attorney Patented Mar. 18, 1924.

1,487,668

UNITED STATES PATENT OFFICE.

GEORGE WILLIAM REHFELD, OF RILEY COUNTY, KANSAS.

SILT ACCUMULATOR.

Application filed April 9, 1921. Serial No. 460,145.

*To all whom it may concern:*

Be it known that I, GEORGE WILLIAM REHFELD, a citizen of the United States, a resident in the county of Riley, State of Kansas, have invented a new and useful Silt Accumulator, of which the following is a specification.

This invention relates to a silt accumulator designed to check the flow of water and to prevent the washing away of land adjacent streams and damage to banks. This is accomplished by providing a structure that will catch logs, drift and sediment and hold the same at the point or points desired, the accumulation of matter thus making a natural breakwater that will act as a protection to adjacent land, especially in the bends of streams. The invention consists of a tripod adapted to be adjusted to suit the location where it is used, and to which is combined a horizontally arranged triangle carried by the tripod, the whole being laced with wires, and both tripod and triangle being formed of separate bars, readily assembled in position. Any number of these units may be employed in a single stream bend, and where several of them are so employed they may be anchored and connected in any desired manner.

In the accompanying drawings:

Figures 1, 2 and 3 are perspective views showing various adjustments of the device, a single unit being shown.

Figure 4 is a detail perspective view showing the manner of connecting the bars together.

In the drawings 1 designates three upwardly and inwardly inclined channel bars, the lower ends of which rest on the bed of the stream, and the upper ends of these bars intersect and are secured by bolts 4, the bars being provided along their length with a series of perforations adapted to receive either bolts or lacing wires 3.

To the open tripod or pyramid thus constructed three similar bars 2 are added, these being placed in the form of a triangle placed in a horizontal plane, their end portions intersecting, said intersecting portions being bolted together, and the bars 2 are also bolted to the bars 1. From any point of view the bars 1 form a series of upwardly and inwardly inclined triangles and the bars 2 always form a horizontal triangle and the wires 3 may be laced back and forth through the perforations of the bars in any desired manner, to catch either sand, sediment, drift or large logs.

The adjustment used depends on the nature of the stream, its depth, the shape of the bend, and the nature of the banks along it. But in no form of adjustment does it lose its pyramidal and triangular character.

What I claim is:—

In a water break, a unit comprising bars having longitudinally spaced openings, fastener means passing through selected openings to connect the bars and retain the bars assembled in the form of a tripod, a second series of bars adapted to form a triangle embracing the said tripod, the above mentioned triangle occupying a horizontal position.

GEORGE WILLIAM REHFELD.